Patented May 9, 1933

1,907,789

UNITED STATES PATENT OFFICE

HARRY B. GOODWIN, OF GRAND JUNCTION, COLORADO, ASSIGNOR TO THE LATIMER-GOODWIN CHEMICAL COMPANY, OF GRAND JUNCTION, COLORADO, A CORPORATION OF COLORADO

COMPOSITION OF MATTER

No Drawing.  Application filed February 18, 1928.  Serial No. 255,502.

In the preparation of emulsions for industrial usage, it has been customary to employ soap or glue. Particularly for horticultural use, oil emulsions have been employed as insecticides for many years, although certain disadvantages have characterized products generally heretofore available. For commercial distribution, any available emulsion should be supplied in a form carrying relatively little water, and adapted for dilution to the necessary extent with water at the place and time of usage. If the oil and water separate in the original container, that is before further dilution and preparation for use, the material is very difficult to re-emulsify and with the appliances ordinarily available in the hands of the user, such a degree of re-emulsification as is properly required can not be had, and the material as sprayed upon vegetation, where carrying portions of unemulsified oil occasions more or less injury to the crops. This breaking down or de-emulsifying can, in some cases, be prevented by the use of a larger quantity of the emulsifier. However, when emulsions are made up with such excess of emulsifier agent, they are found to be much less effective after dilution to proper spray strength than the less stable emulsions, and they also occasion an excessive loss through run-off or drip from the foliage. With the customary emulsifying agents heretofore available, it has not been possible to satisfactorily avoid these two especial difficulties. If it be attempted to decrease the amount of the emulsifying agent to a point to make a product which may be described as "quick breaking", that is allowing some separation as soon as the spray strikes the foliage and thereby leaving an effective oil coating on the surface with a minimum of waste through run-off or drip, and yet with adequate protection against burning of the foliage, the disadvantage of instability in the container is encountered. A preparation which can produce commercially stable emulsions and yet be capable of giving a "quick breaking" effect after dilution is accordingly fundamentally important and highly desirable.

To the accomplishment of the foregoing and related ends, the invention, then, consists of the features hereinafter fully described, and particularly pointed out in the claims, the following description setting forth but one of the various ways in which the principle of the invention may be applied.

In the proceeding in accordance with the invention, I make up a composition by incorporating casein in water, together with gamboge, with conditions favoring permanency of state. An alkaline agent, for example sodium carbonate, may be added. As an illustrative example of such preparation; 0.84 pounds of casein is slowly poured into about 2 gallons of cold water, and stirred until thoroughly wet and soaked, then 0.63 pounds of dehydrated sodium carbonate is added, stirring until all the casein is well in solution. Six gallons of denatured alcohol is then added, and 1.67 pounds of powdered gamboge. The gamboge is added slowly with constant stirring. Enough water is then added to make up a total of 20 gallons. The resultant solution should be clear and of a dark cherry color, and contain not over 0.1 to 0.2% of free alkali. Instead of denatured ethyl alcohol, other available alcohols may be used, for instance methyl alcohol or the higher primary or secondary alcohols. With this composition, the oil to be emulsified is incorporated, preferably by slow additions, with agitation. Most oils emulsify therein readily. Heat may be applied if quicker emulsification is desired. For petroleum oil for example, with a specific gravity of 0.891, a proportion of 1 part by volume of the foregoing composition to 5 parts of the oil affords a satisfactory product. Such emulsion will contain about 83.3% of oil, making up to a consistency about that of lard at the same temperature. Such a product, even after standing in a warm place for months is free from separation. Emulsions customary heretofore, under the same conditions all show separation, with oil at the top and water on the bottom.

Gamboge is a gum-resin, the inspissated juice of various species of the guttiferous germs Garcinia, the gamboge of commerce being mainly derived from *G. hanburii*, native in Siam, Cambodia and Cochin China.

Other desired oils may similarly be made up into the composition for various emulsion requirements, the proportion of oil in any instance depending upon the particular usage in view.

For horticultural spraying, a petroleum oil emulsion as indicated, would ordinarily be used at a spraying strength of 2% oil. This would be obtained from the preparation referred to in the above example by diluting 2.4 gallons of the emulsion to 100 gallons with water. An emulstion as made shows no tendency to separate when standing as long as 12 hours. Where allowed to stand until some separation does occur however, a very slight agitation is sufficient to re-emulsify completely. When sprayed, a highly satisfactory coating on the vegetation is had, with a minimum loss from run-off or drip, and at the same time the oil is well protected against damaging tender foliage.

As indicated, the same principle may be applied with oils variously, whether for spray usage, for cutting oils or other purpose, and all with the marked advantage that a high percentage stock composition can be made up for shipping and handling, and this can then be readily diluted down to the proper extent at the place of usage, being stable both before and after dilution.

Other modes of applying the principle of the invention may be employed, change being made as regards the details disclosed, provided the ingredients stated in any of the following claims, or the equivalent of such be employed.

I therefore particularly point out and distinctly claim as my invention:—

1. An emulsifying composition comprising casein and gamboge.
2. An emulsifying composition comprising casein, gamboge, and an alcohol.
3. An emulsifying composition comprising casein, gamboge, and an alkaline agent.
4. An emulsifying agent comprising casein, gamboge, an alcohol, and an alkaline agent.
5. An emulsifying composition comprising casein, gamboge, and ethyl alcohol.
6. An emulsifying composition comprising casein, gamboge, and soda.
7. An emulsifying composition comprising casein, gamboge, ethyl alcohol, and soda.
8. A composition comprising casein, gamboge, an oil, and water.
9. A composition comprising casein, gamboge, an alcohol, an oil, and water.
10. A composition compirsing casein, gamboge, an alkaline agent, an oil, and water.
11. A composition comprising casein, gamboge, an alcohol, an alkaline agent, an oil, and water.
12. A composition comprising casein, gamboge, ethyl alcohol, an oil, and water.
13. A composition comprising casein, gamboge, soda, an oil, and water.
14. A composition comprising casein, gamboge, ethyl alcohol, soda, an oil, and water.
15. A composition comprising casein, gamboge, alcohol, soda, about 80% of petroleum oil, and water.

Signed by me this 17th day of February, 1928.

HARRY B. GOODWIN.